United States Patent [19]
Ko et al.

[11] Patent Number: 5,511,099
[45] Date of Patent: Apr. 23, 1996

[54] PASSBAND SYNC BLOCK RECOVERY

[75] Inventors: Jung-Wan Ko, Suwon, Rep. of Korea; Christopher H. Strolle, Glenside, Pa.

[73] Assignee: Samsung Electronics Co., Ltd., Kyungki-Do, Rep. of Korea

[21] Appl. No.: 220,028

[22] Filed: Mar. 30, 1994

[51] Int. Cl.$^6$ .................................................. H04L 7/00
[52] U.S. Cl. ........................................................ 375/368
[58] Field of Search .................................. 375/354, 355, 375/362, 364, 365, 368; 370/105.4, 107

[56] References Cited

U.S. PATENT DOCUMENTS

| | | | |
|---|---|---|---|
| 4,649,543 | 3/1987 | Levine | 375/368 |
| 4,651,327 | 3/1987 | Fujita | 375/1 |
| 4,809,305 | 2/1989 | Yamaura | 375/112 |
| 5,121,408 | 6/1992 | Cai et al. | 375/1 |
| 5,233,632 | 8/1993 | Baum et al. | 375/368 |
| 5,245,428 | 9/1993 | De With et al. | 358/133 |
| 5,349,611 | 9/1994 | Varian | 375/368 |
| 5,400,368 | 3/1995 | Cheng et al. | 375/365 |

OTHER PUBLICATIONS

S. Benedetto et al, Digital Transmission Theory, pp. 439–443.
S: W. Golomb et al "Generalized Barker Sequence", IEEE Transactions on Information Theory, vol. IT–11, No. 4 Oct. 1965.

*Primary Examiner*—Stephen Chin
*Assistant Examiner*—Kevin Kim
*Attorney, Agent, or Firm*—Sughrue, Mion, Zinn, Macpeak & Seas

[57] ABSTRACT

A digital communication system includes a data encoder responsive to a digital data stream for forming sequential data blocks from the digital data stream which are representative of information to be communicated. A synchronization data encoder responsive to the digital data stream, generates sequential sync blocks including synchronization data which are related to the sequential data blocks, as well as a prescribed digital sequence. A multiplexor responsive to the sequential data blocks and the sequential sync blocks, combines the blocks in an alternating manner so as to form a block-coded information signal. A modulator responsive to the block-coded information signal, provides a modulated block-coded information signal to a communication channel. A communication channel receiver includes a synchronization data recovery circuit responsive to the modulated block-coded information signal for detecting the prescribed digital sequence and providing at an output a reference signal in response to the detection. A demodulator responsive to the modulated block-coded information signal and the reference signal provided by the synchronization data recovery circuit demodulates the modulated block-coded information signal. Furthermore, a pre-demodulator phase-adjusting circuit is also responsive to the reference signal for adjusting the phase of the modulated block-coded information signal before its demodulation.

37 Claims, 6 Drawing Sheets

| | | | | | | |
|---|---|---|---|---|---|---|
| -0.7 | -0.7 | 0.7 | 0.7 | -0.7 | -0.7 | 0.7 |
| 0.7 | -0.7 | -0.7 | 0.7 | 0.7 | 0.7 | 0.7 |
| -0.7 | -0.7 | 0.7 | 0.7 | -0.7 | -0.7 | -0.7 |
| -0.7 | 0.7 | 0.7 | 0.7 | 0.7 | -0.7 | -0.7 |

| | | | | | | |
|---|---|---|---|---|---|---|
| -0.7 | -0.7 | 0.7 | 0.7 | 0.7 | 0.7 | -0.7 |
| -0.7 | -0.7 | -0.7 | 0.7 | 0.7 | -0.7 | -0.7 |
| 0.7 | 0.7 | 0.7 | 0.7 | -0.7 | -0.7 | 0.7 |
| 0.7 | -0.7 | -0.7 | 0.7 | 0.7 | -0.7 | -0.7 |

PASSBAND SYNC BLOCK RECOVERY

BACKGROUND OF THE INVENTION

1. Field of the Invention

The present invention relates to an improved method and apparatus for obtaining synchronization in a digital communication system, and more particularly, to the encoding and pre-demodulation recovery of synchronization information which is necessary for decoding a modulated block-coded digital information signal.

2. Description of the Prior Art

The modulation and subsequent demodulation of block-coded digital information signals is widely used in various signal transmission or communication systems. One system of particular interest currently is the transmission or communication of high definition television (HDTV) signals. With respect to television signals, as used herein the words "transmission" or "communication" means any communication of the TV signal, such as by broadcasting, narrowcasting or by recording and subsequent playback from a storage medium, such as in a digital VCR. As well known to those of ordinary skill in the art of HDTV television signal processing, digital video information can be processed to develop block-coded digital signals, in an effort to transmit as much information as possible in the limited bandwidth of the transmission channel, while at the same time obtaining as few errors as possible in the recovered and reconstructed HDTV signal. In block coding, a continuous data stream is parsed into sequential blocks of data of prescribed size, $2^k$, which are coded as n-bit codes; n is larger than k, which introduces the redundancy required for error detection and correction. In order to increase the efficiency of data transmission, a symbol coder is customarily used to further encode the n-bit binary codes resulting from block coding, coding them as symbols. A symbol coder, for example, would convert each of successive groups of three binary bits of the block-coded signal into a representative one of eight amplitude levels, each amplitude level uniquely modulating the phase of a carrier signal, commonly referred to as Phase-Shift-Keying (PSK) modulation, which is used for transmitting the coded signal in the transmission channel. Alternatively, groups of four bits can be used to control both phase and amplitude modulation of the carrier, as in a 16 QAM (Quadrature Amplitude Modulation) system, for example.

The format of a block-coded signal descriptive of television images basically comprises a data sub-block having compressed digital information (and also usually associated with a supplemental data sub-block containing an ECC or Error Correcting Code) as well as a sync sub-block having synchronization information encoded therein. The synchronization information encoded in the sync sub-block must be recovered in order properly to reconstruct the time sequence of the original digital information which is in the data sub-blocks. As noted above, in order more efficiently to transmit the digital information, the block-coded signal is used to modulate the phase and possibly the amplitude of a carrier used for transmitting data via a transmission medium (e.g., via a magnetic tape recorded by the recording portion of a VCR). Upon recovery of the transmitted signal (e.g., upon VCR playback), synchronization is necessary for proper operation of the apparatus which demodulates the modulated block-coded signal, as well as for proper operation of the symbol and block decoders.

FIG. 1, illustrates in block diagram form a prior art receiver for a transmission carrier modulated in accordance with symbol-coded response to block-coded signals. An equalizer 2 processes the signal to partially correct for transmission-related amplitude and phase distortions, and after such channel equalization the modulated transmission carrier is applied to a demodulator 4 for detecting the modulation of the transmission carrier. A partial synchronization of the carrier is achieved using a PLL (phase-locked loop) 6, to adjust the frequency of a carrier signal for operating demodulator 4 that is generated by a carrier generator 8. There is also an adjustment of the phase of that carrier signal, but carrier phase lock is usually ambiguous in nature. After demodulation the signal is applied to a complex (Real and Imaginary) baseband equalizer 10, where a phase equalization which is more precise than that which was carried out in equalizer 2 is carried out under the control of a carrier phase detector 12. This phase equalization customarily is done with reference to the content of a portion of the received signal that is known a priori at the receiver, so the phase equalization is non-ambiguous in nature. Next, the block-coded signal is applied to a symbol decoder 14, which converts the symbols back into binary bits, in a manner complementary to the symbol coding performed at the coding section of the system. For proper operation of symbol decoder 14, as well known, synchronizing information, such as the precise phase of the symbols is required, for proper sampling of the epoch of the symbols. The generation of this phase information is illustratively shown as being generated by a symbol phase detector 16. Finally, the block-coded signal recovered by the symbol decoder 14 is applied to a block decoder 18, to be converted back into a continuous stream of time-sequential bits. For proper operation of block decoder 18, block synchronizing information, such as the beginning and end of each block, is needed to identify (and thereafter decode) each block; this synchronizing information is customarily contained in the sync sub-block. This block synchronizing information is provided by a sync detector 19 that responds to certain code groups in the output signal from the symbol decoder 14. After identification and decoding of the sync sub-block information, the remainder of the block-coded signal can be decoded.

Thus, current receivers for modulated block-coded signals require a plurality of frequency and phase detectors, and associated feedback and feedforward loops, for synchronizing the demodulating and decoding processing for proper recovery of block-coded information signals. Additionally, some of the circuitry may require complex signal processing, involving real and imaginary components of signal, adding further to the complexity of the synchronizing system. The present invention is directed to a more straightforward method and apparatus for obtaining the synchronization information necessary for recovery of such signals, wherein the synchronization information can be detected directly from the envelope of the modulated transmission carrier.

SUMMARY OF THE INVENTION

In its broadest sense, the present invention comprises means for supplying a modulated carrier wave, modulated at selected times in accordance with a prescribed digital sequence having high autocorrelation properties, and modulated at times between said selected times in accordance with another signal. An analog-to-digital converter responsive to the modulated carrier wave supplies a digitized response to the modulated carrier wave, and a matched filter responsive to the digitized response generates a spike response to each of the prescribed sequences. The spike response is processed to recover synchronizing information which is used to control demodulation of the modulated signal, as well as phase adjustment of the modulated signal, before demodulation.

Another aspect of the invention comprises a digital information transmission and reception system for transmitting information provided in the form of a digital data stream, which system includes an encoding means responsive to the digital data stream for forming sequential data blocks from the digital data stream which are representative of the information. A sync means, responsive to the digital data stream, generates sequential sync blocks of synchronization data which are related to the sequential data blocks (e.g., identify the original time-sequence of the data in the data blocks), and also includes as synchronization data a prescribed digital sequence having high autocorrelation properties. A multiplexing means, responsive to the sequential data blocks and the sequential sync blocks, combines the blocks in an alternating manner so as to form a block-coded information signal. A modulation means, responsive to the block-coded information signal, provides a modulated block-coded information signal to a communication channel. In a channel receiver, a synchronization data recovery means is responsive to the modulated block-coded information signal for detecting the prescribed sequence component of the synchronization data and providing at an output a reference signal in response to the detection. A demodulation means, responsive to the modulated block-coded information signal and the reference signal provided by the synchronization data recovery means, demodulates the modulated block-coded information signal.

In accordance with a further aspect of the invention, the reference signal is used to not only synchronize the operation of the demodulation means, but to also synchronize the operation of a block decoder.

In accordance with a still further aspect of the invention, in which the bits of the block-coded signal are also coded into symbols, the reference signal is used to synchronize the operation of a symbol decoder.

In accordance with an even further aspect of the invention, a phase adjusting processor precedes the demodulator means, and is responsive to the reference signal for adjusting the phase of the modulated block-coded signal.

In accordance with all of the above arrangements, synchronizing information is extracted from the block-coded signal by a single sync detector apparatus before its demodulation. This is advantageous because it allows a feedback or feed forward synchronizing control that is simpler than the multiple frequency/phase detectors used in the prior art. Additionally, phase correction can be accomplished before demodulation, thereby reducing the timing errors in the remainder of the decoder, and allowing the time constants of the synchronizing loops to be reduced.

DETAILED DESCRIPTION OF THE INVENTION

Figure 2:
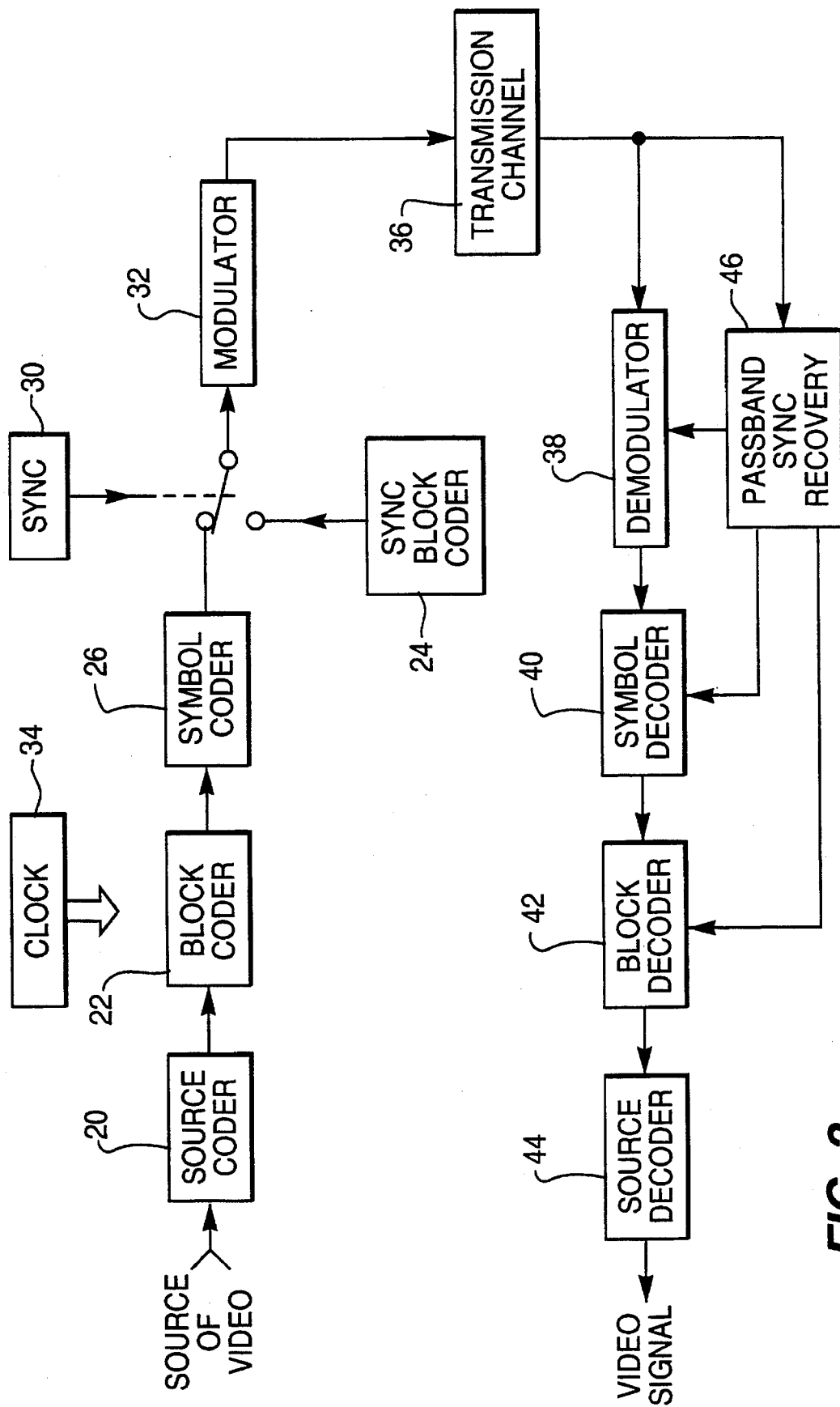
FIG. 2 illustrates in block diagram form an embodiment of digital information transmission apparatus constructed in accordance with the principles of the present invention.

A digital information signal transmission system, such as a digital VCR, is illustrated in block diagram form in FIG. 2. Since the invention relates to an improved method and apparatus for obtaining synchronization in a digital information transmission system, the illustrated preferred embodiment of the invention is presented in a somewhat generalized manner, so as to not to "clutter-up" the description of the invention with details of any particular embodiment in which the invention finds value. Thus, although a digital VCR system for transmitting an HDTV signal is used for illustrating a preferred embodiment of the invention, many details of such a system which are merely auxiliary to developing an understanding of the present invention, such as specific image compression algorithms or block coding techniques, the handling of other ones of the HDTV signal components (e.g., the audio component, etc.), either are not described or are only briefly referred to.

A source of video signal is provided by, e.g., one of a television camera, video detector portion of a television tuner or similar device. A source coder 20 provides image compression coding of the video signal and may comprise, for example, one of many well known coding systems useful for television signals, such as those proposed by the Standards Committee of the Motion Pictures Expert Group (MPEG). As well known to those of ordinary skill in this technology, MPEG processing provides compression coding of up to 30 frames per second of full-motion video signals along with a corresponding high-quality sound signal, but presents some problems with being compatible with VCR features such as single frame advance, reverse motion, and still frame video. Accordingly, to facilitate such VCR trick-play features, the source coder 20 may include means for recoding the images described by the MPEG digital signal on a per-frame coding basis. One such means for recoding the images partitions the images into blocks which are subjected to a two-dimensional discrete cosine transform (DCT), classifies the resulting transforms based on statistical quantities such as activity and dispersion, scalar quantizes the DC coefficients of the DCTs, and multi-stage vector quantizes the AC coefficients of the DCTs using codebooks specified by the classifier. The thresholds of acceptable error for each stage of vector quantization are adjusted to keep the number of bits per image field or frame constant. In alternative embodiments of the invention in which the source of video signal provides analog signals, an A/D converter (not shown) will be included as a stage preceding source coder 20.

The output of source coder 20 is a continuous stream of compression-coded digital data representative of the video signal, which is applied to a block coder 22. Block coder 22 reorganizes the incoming data from source coder 20 into a series of blocks of coded data. Each block includes at least one data sub-block including encoded video information, and preferably an associated error correcting code (ECC) sub-block. The ECC could be a conventional CRC (Cyclic Reduction Check) or Reed-Solomon code, by way of specific examples. Related to each data sub-block is a sync sub-block, formed by a sync block coder 24,. The sync sub-block includes synchronization information which identifies the correct position of the data sub-block in the original data stream (such as "line 45, frame 1). Additionally, it is noted that the recognition of the occurrence of the synchronization information can also indicate the start of the sync sub-block, that is, its mere occurrence provides a piece of information which can be used for correctly parsing the blocks (i.e., determing where each sync block ends and the next consecutive one begins). The particular construction and operation of block coder 22 is not important to the understanding of the present invention, and any one of many block coders well known to those of ordinary skill in the digital television signal processing technology could be utilized. Basic information concerning the construction and operation of block coders can be found, for example, in the book entitled DIGITAL TRANSMISSION THEORY by Benedetto et al. published by Prentice-Hall Inc. in 1987.

Figures 9A, 9B, 9C:
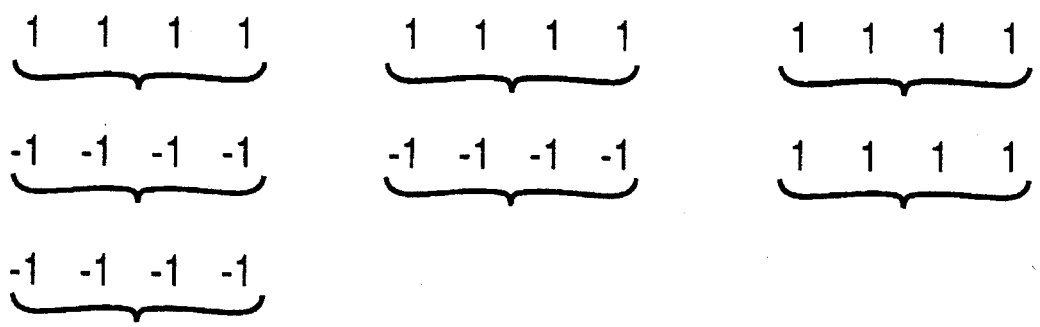
FIGS. 9a, 9b and 9c illustrate sequences useful for understanding the operation of portions of the illustrated embodiments.

In accordance with one aspect of the present invention, and for reasons to be described in greater detail later on, sync block coder 24 uses a prescribed digital sequence having high autocorrelation properties, such as a Barker Code or a pseudo-random (PR) sequence (also referred to as a "pseudo-random noise sequence" or "PN sequence"), as a sync signal either for insertion into a predetermined time portion (in usual designs, the beginning) of the sync sub-block, or for coding at least a portion of the synchronizing information. The prescribed sequence for the sync information is constructed so as to have a zero-valued direct component, but also to have a high-valued autocorrelation property. As will be described later on, FIG. 9(a) illustrates a seven-bit Barker Code used in a preferred embodiment of the invention because it is shorter than most PR sequences that might be used in alternative embodiments of the invention.

The sync sub-blocks from coder 24 are time-interleaved with the data sub-blocks from coder 20, as symbolically illustrated by applying the respectively coded sub-blocks to inputs A and B of a switch 28. A sync switch signal generator 30 supplies a switching signal to switch 28 for providing to a modulator 32 a final block-coded signal having the sync and data sub-blocks interleaved as illustrated. The final block-coded signal is used for controlling the modulation (using, for example, PSK or QAM techniques) of a transmission signal carrier, which modulation is carried out in a modulator 32.

A symbol coder 26 processes the block-coded signal, either before or after insertion of the sync block, for converting each successive group of bits in the data block (e.g., each three bits) into a corresponding single piece of information for application to the modulator 32, such as which one of eight phases is to selected in an 8 PSK modulator for transmission. Such symbol coding, as well known, increases the efficiency of the transmission channel. In the preferred embodiment of FIG. 2, the symbol coder 26 is shown connected before switch 28. This way, symbol coder 26 will not affect the high-valued autocorrelation property of the prescribed sync sequence provided by sync block coder 24 and inserted by switch 28 into the block-coded signal. An additional advantage is that a common AGC (automatic gain control) operates on both the sync and data sub-blocks. However, if desired for other reasons, the symbol coder can be placed after sync insertion, in which case the symbol coding scheme must be chosen so as to not significantly disturb the autocorrelation properties of the prescribed sync sequence.

A clock signal generator 34 generates and supplies synchronized clocking signals which suffice to operate coders 20, 22, 24 and 26, as well as sync switch signal generator 30 and modulator 32, in a known and orderly manner. Thus, the frequency and phase of the source, block, symbol and sync coding, as well as the modulation of the transmitted signal, are synchronized with respect to each other. This common synchronization is advantageously used, in accordance with the invention, in the recovery of the block-coded signal.

In a digital VCR embodiment, the final block-coded signal represents the complete picture information, such as the luminance (Y), chrominance (C) and audio components of the HDTV signal. In the illustrated preferred embodiment, the input of transmission channel 36 comprises the helical scanning recording heads (not explicitly shown) of the VCR. The recording heads magnetically store the modulated block-coded signal on a magnetic recording tape, corresponding to transmission channel 36, and the output of transmission channel 36 comprises the playback heads (not explicitly shown) of the VCR which recover the stored modulated block-coded signal. The recovered modulated block-coded signal is provided to a demodulator 38 where it is frequency shifted to a lower, baseband frequency range by synchronously detecting it in accordance with a carrier. The demodulated signal is then provided to a symbol decoder 40. Symbol decoder 40 processes the demodulated signal in a manner complementary to that provided by symbol coder 26, thereby reconstructing the block-coded signal including the original data bits of the data sub-blocks. After symbol decoding, the block-coded signal is applied to a block decoder 42. Block decoder 42 processes the block-coded signal in a manner complementary to that provided by block coder 22, thereby reconstructing the source-coded digital data stream. After block decoding, the reconstructed signal is applied to a source decoder 44, which provides image decoding in a manner complementary to that provided by source coder 20, and provides at an output thereof a video signal which can be, for example, reproduced by a television receiver. Time delay circuitry is provided throughout the above-described embodiment, as appropriately needed and conventional in the technology, and therefore is not discussed any further.

Thus, as is clear from the above description, the demodulator requires precise frequency and phase information for generating a baseband signal without phase errors, the symbol decoder requires precise symbol phase information in order to correctly decode the symbols into corresponding groups of bits, and the block decoder requires precise sync information (e.g., a start of sync block indication signal) to decode (re-organize) the binary signal in the data sub-blocks into the original data stream as it was presented to the block coder. In current transmission systems for modulated block-coded data, such as FIG. 1 previously described, the received (recovered) modulated signal is demodulated in order to recover the synchronizing information from the block-coded signal which is required for controlling the demodulator and symbol and block decoders. Typical post demodulator synchronization information recovery is shown for use in general digital information transmission systems, for example, in U.S. Pat. No. 4,809,305 issued to Yamaura on Feb. 28, 1989 and in U.S. Pat. No. 4,651,327 issued to Fujita on Mar. 17, 1087, and shown for use in a digital VCR in U.S. Pat. No. 5,245,428 issued to DeWith et al on Sep. 14, 1993.

Figure 1:
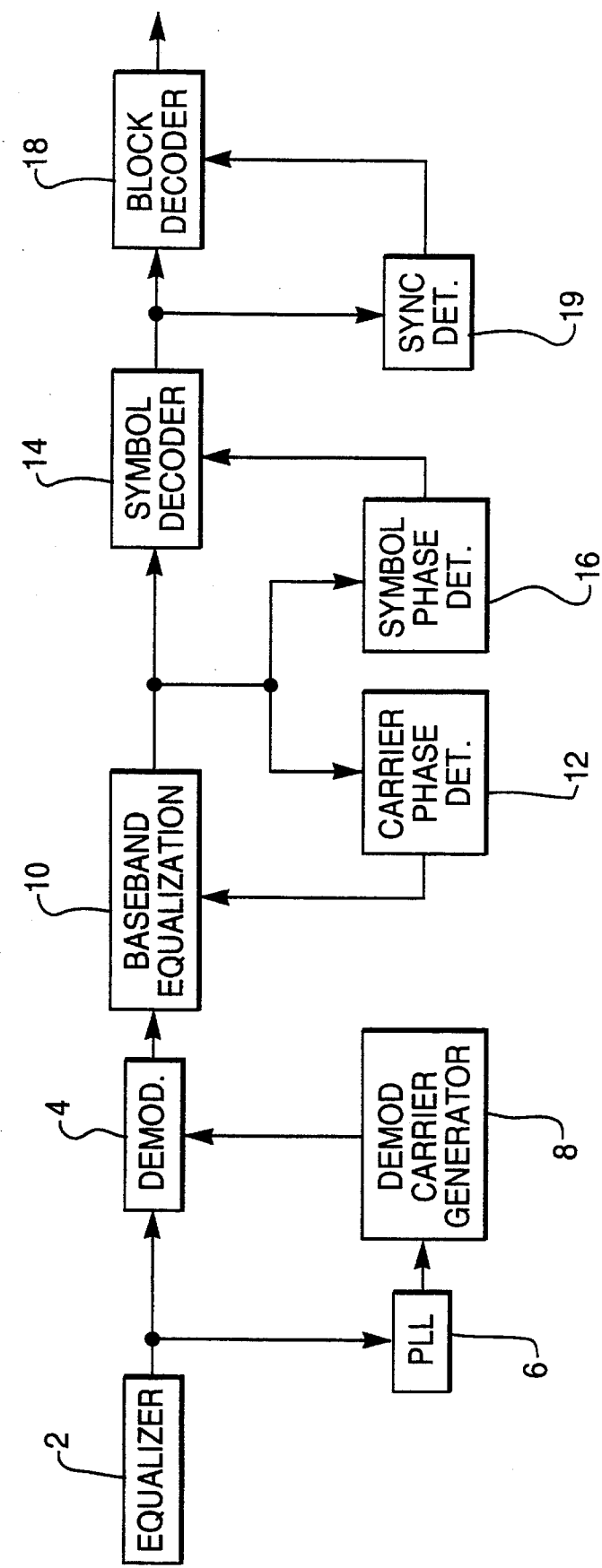
FIG. 1 illustrates in block diagram form a prior art decoder for modulated block-coded signals, already described in the Background of the Invention.

Post-demodulation detection of the sync information is not favored by the inventors since it requires individual detection of the synchronizing information, such as shown in FIG. 1 for detection of the carrier frequency and phase, detection of the symbol phase and detection of sync block information, such as the start of the sync sub-block. Furthermore, as shown in the embodiment of the forenoted U.S. Pat. No. 4,651,327, two sync recovery processors, one for each of the I and Q post demodulator channels may be required. These requirements undesirably increase the complexity and cost of the receive or signal recovery portion of the system. Additionally, owing to the differences in frequency between the transmission signal carrier and the data rate in the block-coded signal, it may be advantageous, for complexity and cost reasons, to recover the synchronization information before demodulation of the recovered signals, if possible.

Thus, in accordance with another aspect of the present invention, the modulated signal recovered from the transmission channel is applied not only to demodulator 38, but also, in parallel, to a passband sync recovery circuit 46. The term "passband" is used herein to refer to the recovery of the synchronization information before demodulation of the recovered signal, that is, while the frequency range of the recovered signal is still in the "passband" of the transmission channel.

In accordance with this aspect of the invention, the single passband sync recovery circuit 46 not only recovers synchronization information from the received signal which is applied to demodulator 38 for controlling demodulation of the transmission carrier, but also recovers synchronization information from the received signal, which is then applied to symbol decoder 40 and block decoder 42 in order that they can properly decode the block-coded signal. Additionally, the recovered synchronization information can be used for phase equalization of the recovered signal before demodulation. As previously noted, this allows a feedback or feed-forward synchronizing control which is simpler than the multiple frequency/phase detectors used in the prior art. Additionally, phase equalization before demodulation reduces timing errors in the remainder of the decoder, and allows the time constants of the synchronizing loops to be reduced.

Figures 3, 4:
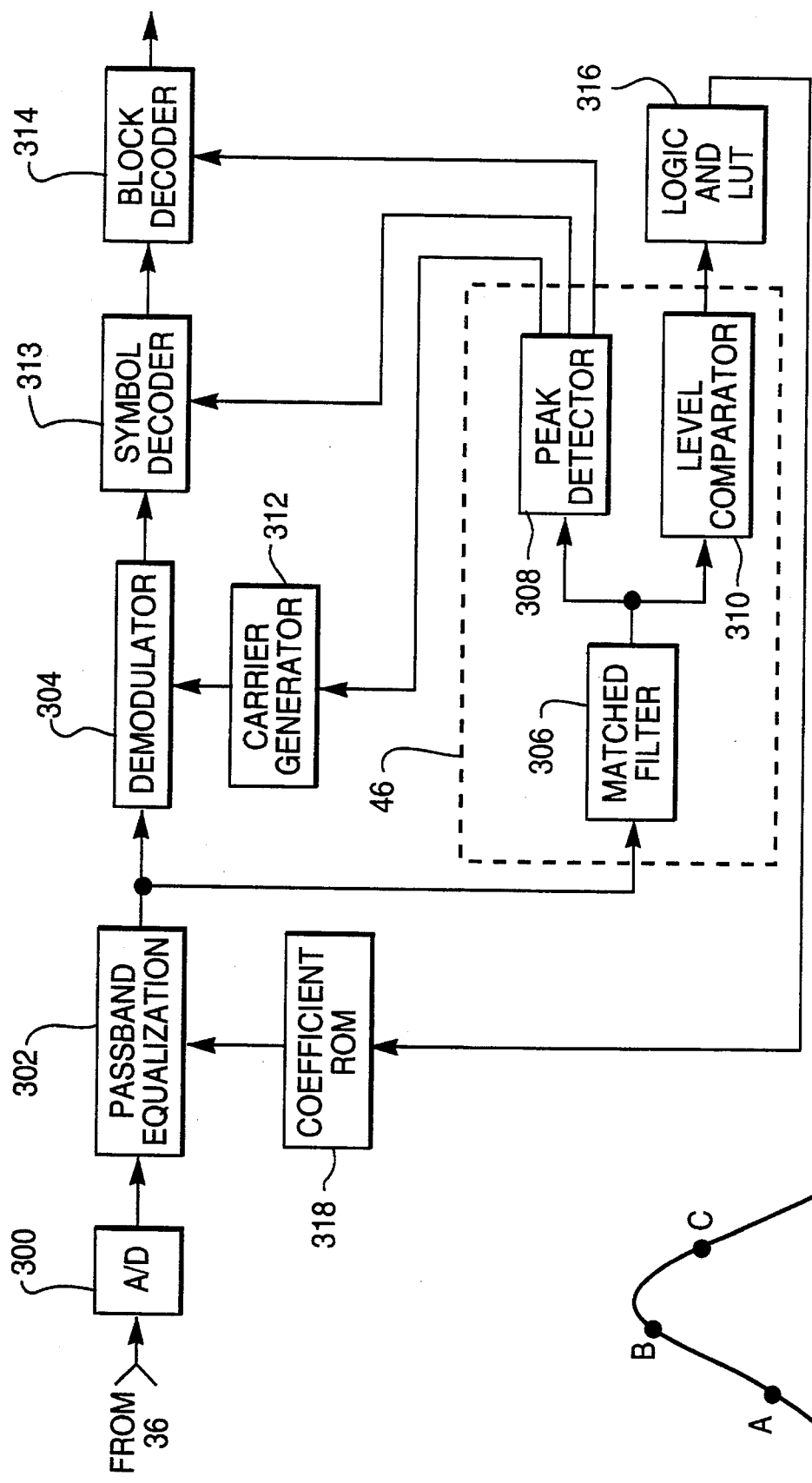
FIG. 3 illustrates in block diagram form details of a portion of the embodiment shown in FIG. 2.
FIG. 4 illustrates a waveform useful for understanding the operation of a portion of the block diagram shown in FIG. 3.

FIG. 3 illustrates in greater detail that portion of FIG. 2 dealing with the recovery and use of the synchronization information from the transmitted information signal. An analog to digital (A/D) converter 300 provides digital samples of the recovered signal to a passband equalizer 302. Equalizer 302 may comprise, as known, cascaded first and second FIR filters, the responses of which are convolved, wherein the first filter changes the amplitude response of the input signal so as to correct for amplitude distortions as can be introduced by the transmission channel or the A/D converter or both, and the second filter introduces a controllable group delay to the phase of the input signal so as to provide phase synchronization with the subsequent signal processing. As noted above, phase adjusting before demodulation is particularly advantageous because it reduces timing errors in the remainder of the decoder, and allows the time constants of the synchronizing loops to be reduced. Additionally, phase equalization of the baseband signal in the complex-frequency domain is avoided.

The demodulator 304 typically comprises a digital multiplier multiplying the digital samples supplied from the passband equalizer 302 by a sinusoidal carrier to generate a product including a demodulated stream of samples at baseband. A first set of alternate ones of these samples describes a real baseband function, and another second set of alternate ones of these samples describes an imaginary baseband function. Alternatively, the demodulator 304 can comprise a complex digital multiplier used to multiply the digital samples supplied from the passband equalizer 302 by a complex sinusoidal carrier to generate a complex product including a first stream of samples of the real baseband function and including a second stream of samples of the imaginary baseband function, samples being supplied simultaneously in said first and second streams.

Sync recovery circuit 46 includes a matched filter 306 which provides its output in common to a peak detector 308 and level comparator 310. As previously noted, at least a portion of the sync information in the sync sub-block portion of the block-coded signal includes or was formed using a prescribed sequence having a high-valued autocorrelation function. Accordingly, the output of matched filter 306, shown by the waveform of FIG. 4, will have a peak upon each detection of the prescribed sequence in the sync sub-block. Matched filter 306 may comprise an FIR filter having coefficients which exactly match the prescribed sequence used in the sync sub-block, thereby providing an amplitude peak at its output when matched filter 206 processes the sync sub-block. The amplitude peak occurs at a known frequency and phase with respect to the frequency and phase of the signals used to form the block-coded signal, owing to the known position of the prescribed sequence in the sync sub-block and the common clock 14, shown in FIG. 2, used to control the encoding.

Peak detector 308 detects the peak of the amplitude response and provides one or more appropriately delayed and pulse-width adjusted output signals for use in the transmission recovery circuitry. In the illustrated embodiment, a relatively narrow pulse-width pulse is provided by peak detector 308, upon detection of the prescribed sequence, to the reset input of a carrier signal generator 312. Generator 312 provides, for example, a 10 MHz carrier signal to demodulator 304 for demodulating the recovered information signal in a manner such as described in conjunction with the description of demodulator 38 of FIG. 2. The generator 312 can generate sinusoidal carrier in digitized form relying on table look-up from read only memory supplied addressing from a digital counter. The counter is arranged to count the input samples clocked to the demodulator 304 and, when reset to an initial count value in response to the pulse from the peak detector 308, restores the phase of the sinusoidal carrier to a prescribed value. A relatively wide pulse-width signal (approx. 2 MHz) having an appropriate delay is provided by peak detector 308 to block decoder 310, which indicates "start of sync" timing for synchronizing the block decoding. An appropriately delayed pulse signal is also provided to symbol decoder 313 for controlling its decoding of the symbols back into the original data bits of the block-coded signal.

As previously noted, each symbol of the block-coded signal may correspond to three bits of data, wherein the three bits of data describe e.g., eight levels of phase shift keying (8 PSK). Since in the encoder (before transmission of the information signal), the data clock, symbol clock and transmission carrier signal are all synchronized via a common source of clock signals, i.e., clock 14, recovery of synchronization information by passband sync recovery circuit 46 is sufficient to provide control signals for proper operation of symbol decoder 313, as well as demodulator 304, block decoder 314 and equalizer 302.

The construction and operation of symbol decoders is well known to those of ordinary skill in this technology (see e.g., U.S. Pat. No. 5,103,465 issued to Crisler et al on Apr. 7, 1992 and U.S. Pat. Nos. 5,208,833 and 5,208,839, both issued on May 4, 1993) and therefore further description of the construction and operation of symbol decoder 313 is deemed to not be necessary.

As briefly noted above, and as will be described in greater detail next, the output of matched filter 306 is also used to develop control signals for adjusting the phase of the recovered modulated signal before its demodulation, using passband equalization circuit 302.

As previously stated, FIG. 4 shows in detail the shape of the correlation curve for an N-bit band-limited version of the prescribed synchronization signal sequence. At the output of matched filter 306, samples of this curve are provided, evenly spaced in time, to peak detector 308 and level comparator 310. The frequency of the prescribed synchronization signal sequence can be simply determined by detecting the peak of this curve, using peak detector 308. Furthermore, the phase of the prescribed synchronization signal sequence can also be simply determined by examining a few samples of the curve which are near or flanking its peak, using level comparator 310. As shown in FIG. 4, these samples are labeled A, B and C. There will be, at most, one set of such consecutive samples near the peak where the middle sample, B, is greater than the adjacent two samples. When such a condition is found, the phase of the clock component of the prescribed synchronizing signal sequence can be determined by carefully comparing points A and C. If C is greater than A, as shown, it indicates that the samples have been taken too early. The degree of "earliness" can be estimated by a quantitative comparison of samples A and C. Conversely, when A is greater than C, it indicates that the samples have been taken too late. The correct phase of the sampling occurs when points A and C are equal in amplitude. Level comparator 310 includes, for example, a plurality of comparators for determining the relative amplitude of points A, B and C which provide outputs, e.g., to up/down counters used as integrators for developing digital signal representative of the "earliness" or "lateness" of the sampling. This procedure is described in greater detail in U.S. patent application Ser. No. 07/819,890 filed 13 Jan. 1992 by C. H. Strolle et afii, entitled DIGITAL MODULATORS FOR USE WITH SUB-NYQUIST SAMPLING OF RASTER-SCANNED SAMPLES OF IMAGE INTENSITY, incorporated herein by reference and assigned like this application to Samsung Electronics, Inc., pursuant to employee obligations so to assign that were in force at the time the inventions were made. These representative digital signals are applied as addresses to a look-up table (ROM) 316 having stored therein addresses which are to be applied to a further look-up table (ROM) 318. ROM 318 has stored therein coefficient sets which are provided to the FIR filters of equalizer 302 in order to change their amplitude and phase transfer characteristics, thereby adjusting the amplitude and phase of the processed signal. The replacement of the cascaded ROMs 316 and 318 by a single ROM is possible, of course.

The construction and operation of FIR filters for amplitude-and phase-equalization of digital signals is well known to those of ordinarily skill in digital signal processing technology, and are described, e.g., in the book entitled Multirate Systems And Filter Banks, written by P. P. Vaidyanathan, and published by Prentice-Hall in Englewood Cliffs, N.J. in 1993. Such equalizers currently find wide use—e.g., in audio compact disc players, for equalizing the amplitude response of the A/D converter and easing the subsequent filtering requirements. The equalizer comprises cascaded first and second FIR filters incorporated on an integrated circuit, such as commercially available from Sony Corporation and identified by chip designation CX23034.

Additionally, it is noted that prior art autocorrelation detectors, peak detectors and level detectors for recovering synchronizing information in a digital information transmission system are well known, being shown in the forenoted U.S. Pat. No. 4,651,327 as well as in U.S. Pat. No. 5,121,408 issued to Cai et al on Jun. 9, 1992, by way of specific examples.

It is also noted that although not illustrated, autocorrelation detectors of a type other than matched filter 306 could be used for detecting the prescribed sync sequence, such as, for example, a multi-tap filter wherein the position of the taps are set so that their summation will provide a peak amplitude response upon processing by the filter of the prescribed sequence.

As noted above in the description of sync block coder 6, the prescribed sequence synchronization signal may be a binary-valued (+1) pseudo-random (PR) sequence. This signal has the property that its autocorrelation function equals N (where N equals the number of bits in the sequence) at 0 and −1 everywhere else. Often, the bit rate of the synchronization sequence is significantly lower than the sample rate of the system. This is done to preserve the integrity of the synchronization waveform in a band-limited system. Ideally, it is desirable to make the PR sync sequence as long as possible by increasing N. This would increase the signal-to-noise ratio in the recovered signal, and maximize the number of transitions used to determine proper synchronization. Unfortunately, increasing N tends to increase the complexity of the correlator or matched filter used for recovering the synchronizing information, resulting in higher costs. In the preferred embodiment, a compromise which gives good performance while minimizing hardware and software is to repeat a shorter PR sync sequence a plurality of times. Thus, the correlator or matched filter then processes a shorter PR sequence, and the result of the processing of the shorter PR sequences can be stored in registers or counters for subsequent combination. In the preferred embodiment, as will be described next, a sample rate of 10 MHz was used, along with a 7-bit sequence sampled four times per bit and repeated 15 times during a selected line of each data field descriptive of a respective television field. It should also be noted that additional synchronization information can be encoded into the prescribed sequence—e.g., by adjusting the Barker Code polarity so that a sequence of polarity changes of the peak response provided by peak detector 308 provides additional synchronization information.

Figure 5:
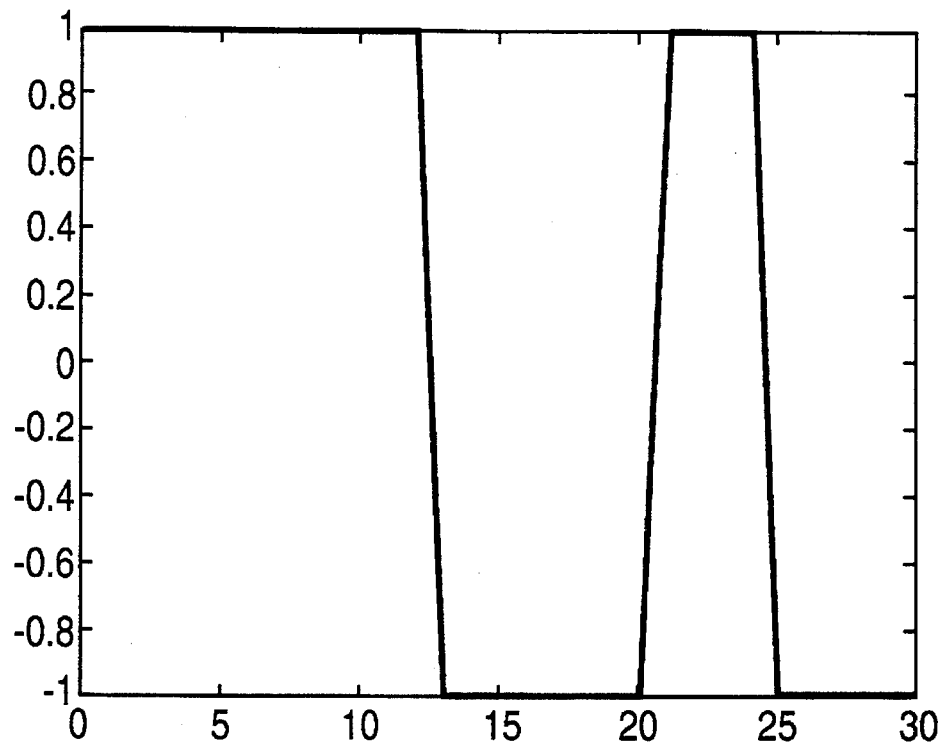
FIG. 5 illustrates a waveform for a 7-bit Barker Code, suitable for encoding with the sync signal, in accordance with the principles of the present invention.
Figure 6:
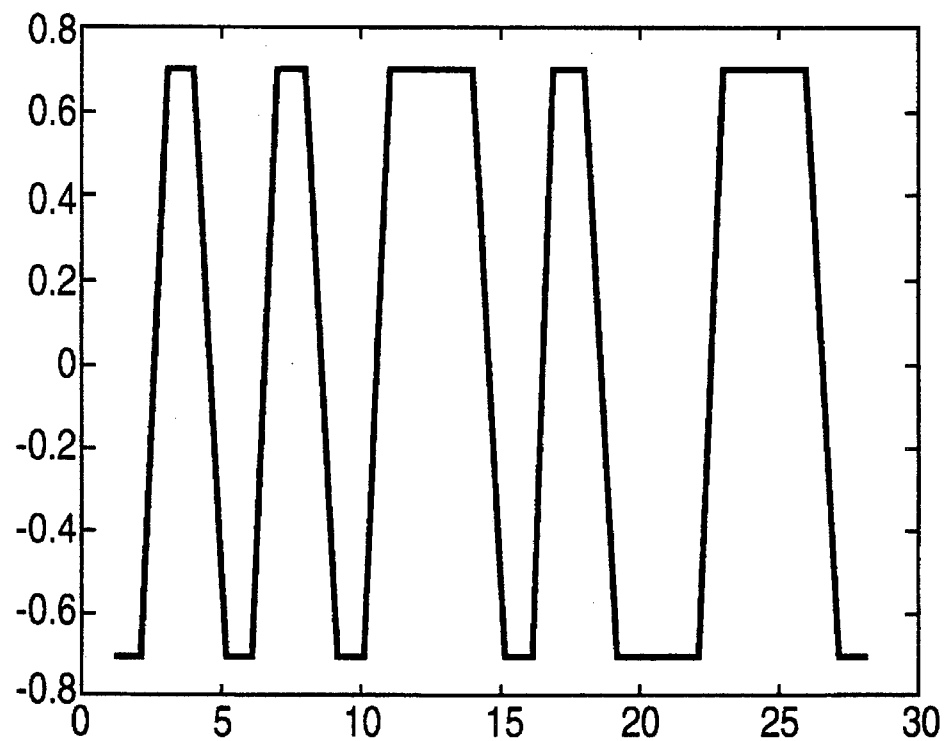
FIG. 6 illustrates a modulated waveform for the 7-bit Barker Code shown in FIG. 5.
Figure 7:
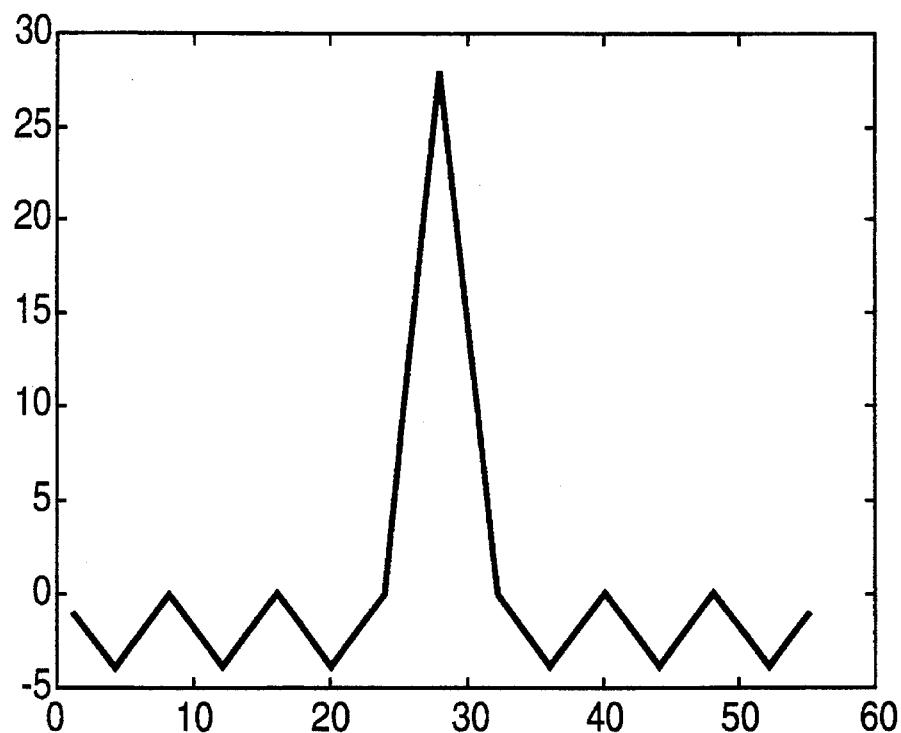
FIG. 7 illustrates the output of a matched filter set to detect the waveform shown in FIG. 5.
Figure 8:
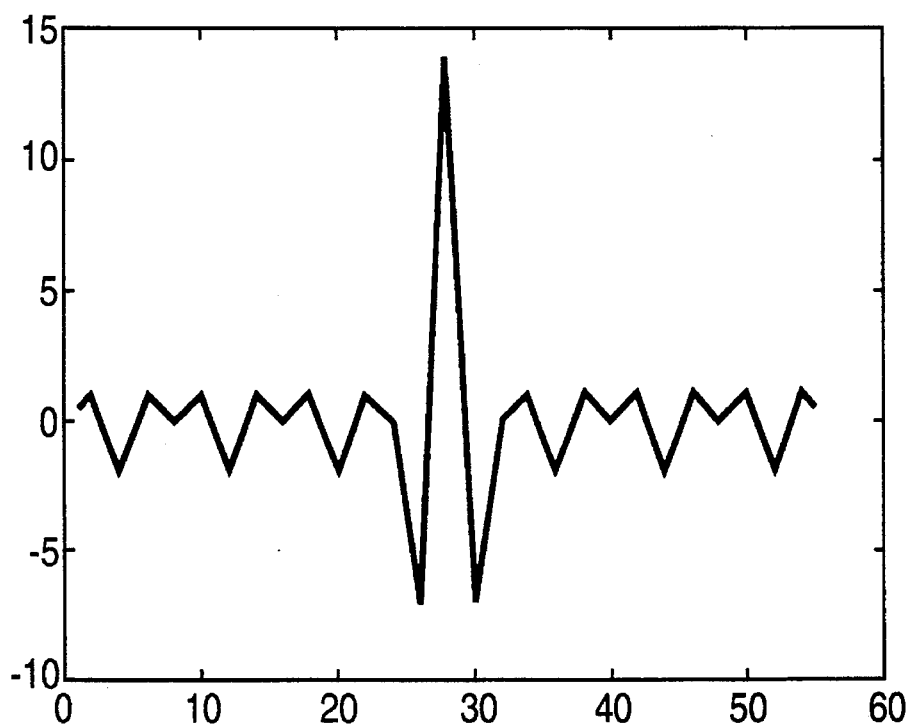
FIG. 8 illustrates the output of a matched filter set to detect the waveform shown in FIG. 6.

Reference should now be made to FIGS. 5–9, which illustrate a simulation of the operation of matched filter 306 in a system using a 7-bit Barker Code for conveying the sync information. FIGS. 5 and 9(a) illustrate the 7-bit Barker Code. FIG. 9(a) also shows the grouping of four adjacent bits to make a symbol. FIG. 6 illustrates modulation of the Barker code by a 2X carrier, as may be provided by modulator 32 of FIG. 2. FIGS. 7 and 8 illustrate the spiked output response of a matched filter for the codes of FIGS. 5 and 6. Note from FIG. 8 that a significant peak or spike response is still obtainable from the matched filter for the 2X modulated signal. FIG. 9(b) illustrates the normalized amplitude response of a suppressed AM carrier modulated by the Barker Code of FIG. 6. FIG. 9(c) illustrates the coefficients required for causing an FIR matched filter to provide the output as shown by FIG. 8 in response to the waveform shown by FIG. 6 and the normalized amplitude values of FIG. 9(*b*). Note, as well known, the coefficients needed for proper operation of the matched filter correspond to the reverse order of the normalized amplitude values of the signal to be detected, i.e., those values shown in FIG. 9(*b*).

Those skilled in the art will recognize that the foregoing description has been presented for the sake of illustration and description only. As such, it is not intended to be exhaustive or to limit the invention to the precise form disclosed. For example, modification and variations, some of which were previously indicated, are possible in light of the above teachings which are considered to be within the scope and spirit of the present invention. Thus, it is to be understood that the claims appended hereto are intended to cover all such modifications and variations which fall within the true scope and spirit of the invention.

What is claimed is:

1. A digital information transmission and reception system, comprising:

an information source for providing information in the form of a digital data stream;

encoding means responsive to said digital data stream for forming sequential data blocks from said digital data stream which are representative of said information;

sync means, responsive to said digital data stream for generating sequential sync blocks of synchronization data related to said sequential data blocks, and including a prescribed digital signal sequence;

multiplexing means, responsive to said sequential data blocks and said sequential sync blocks for combining said blocks in an alternating manner to form a block-coded information signal;

modulation means, responsive to said block-coded information signal for providing a modulated block-coded information signal to an information transmission channel, from which information transmission channel said modulated block-coded information signal is recovered modulated on a first carrier substantially removed from zero frequency;

synchronization data recovery means responsive to said recovered modulated block-coded information signal for detecting said prescribed digital signal sequence and providing at an output a reference signal in response to said detection, said synchronization data recovery means including a matched filter that receives said recovered modulated block-coded information signal to supply an amplitude response thereto and has a kernel composed of fixed-value weights defined in accordance with said prescribed digital signal sequence, and including a peak detector providing as said reference signal selective response to spikes in said amplitude response that occur in response to said modulated block-coded information signal having said first carrier currently modulated in accordance with said prescribed digital signal sequence;

a carrier generator for generating a second carrier similar in frequency to said first carrier, reset to a prescribed phase responsive to said reference signal; and demodulation means, responsive to said recovered modulated block-coded information signal and to said second carrier, for generating a demodulated block-coded information signal.

2. A digital information system in accordance with claim 1, further comprising:

block decoder means responsive to said demodulated block-coded information signal and said reference signal provided from said synchronization data recovery means for decoding said block-coded information signal, said block decoder means using said reference signal for determining the occurrence of a boundary between successive ones of said blocks.

3. A digital information system in accordance with claim 1, further including:

digital phase adjusting means for shifting the phase of said modulated block-coded information signal before providing it to said demodulator means; and phase detection means responsive to said reference signal provided from said synchronization data recovery means for developing control signals for controlling said digital phase adjusting means in a feedback manner, thereby synchronizing the operation of said digital phase adjusting means with said demodulator means.

4. A digital information system in accordance with claim 1, wherein said sync means develops, as said prescribed digital signal sequence for said sequential sync blocks, a digital sequence having high autocorrelation properties.

5. A digital information system in accordance with claim 4, wherein:

the prescribed digital signal sequence comprises a pseudo-random (PR) sequence.

6. A digital information system in accordance with claim 4, wherein:

the prescribed digital signal sequence comprises a Barker-Code sequence.

7. A digital information system in accordance with claim 6, wherein:

the prescribed digital signal sequence comprises a relatively short Barker-Code sequence which is sequentially repeated a plurality of times.

8. A digital information system in accordance with claim 4, further including:

a level comparator, responsive to the amplitude response of said matched filter for providing a phase correction signal synchronized to the phase of the digital data in said block-coded information signal; and digital phase adjusting means responsive to said phase correction signal for shifting the phase of one of said second carrier and said modulated block-coded information signal respective to the other as applied to said demodulator means.

9. A digital information system in accordance with claim 5, further comprising:

block decoder means responsive to said demodulated block-coded information signal and said reference signal provided from said synchronization data recovery means for decoding said block-coded information signal, said block decoder means using said reference signal for determining the occurrence of a boundary between successive ones of said blocks.

10. A digital information system in accordance with claim 5, further comprising:

a level comparator, responsive to the reference signal provided from said matched filter for providing a phase correction signal synchronized to the phase of the data in said block-coded information signal: and digital phase adjusting means responsive to said phase correction signal for shifting the phase of one of said second carrier and said modulated block-coded information signal respective to the other as applied to said demodulator means.

11. A digital information system in accordance with claim 6, further comprising:

block decoder means responsive to said demodulated block-coded information signal and said reference signal provided from said synchronization data recovery means for decoding said block-coded information signal said block decoder means using said reference signal for determining the occurrence of a boundary between successive ones of said blocks.

12. A digital information system in accordance with claim 6, further comprising:

a level comparator, responsive to the reference signal provided from said matched filter for providing a phase correction signal synchronized to the phase of the data in said block-coded information signal; and digital phase adjusting means responsive to said phase correction signal for shifting the phase of one of said second carrier and said modulated block-coded information signal respective to the other as applied to said demodulator means.

13. A digital information transmission and reception system comprising:

an information source for providing information in the form of a digital data stream;

encoding means responsive to said digital data stream for forming sequential data blocks from said digital data stream which are representative of said information;

sync means responsive to said digital data stream for generating sequential sync blocks of synchronization data related to said sequential data blocks, each of said sequential sync blocks respectively including a pseudo-random sequence having a high autocorrelation function;

multiplexing means, responsive to said sequential data blocks and said sequential sync blocks for combining said blocks in an alternating manner to form a block-coded information signal;

modulation means, modulating a carrier responsive to said block-coded information signal for providing a modulated block-coded information signal to an information transmission channel;

synchronization data recovery means, responsive to the modulated block-coded information signal as recovered from said information transmission channel for detecting said prescribed digital signal sequence and providing at an output thereof a reference signal in response to said detection, said synchronization data recovery means comprising a matched filter having coefficients set in accordance with the pseudo-random sequence of said synchronization data;

demodulation means, responsive to said modulated block-coded information signal recovered from said information transmission channel and to said reference signal provided by said synchronization data recovery means, for generating a demodulated block-coded information signal;

a level comparator, responsive to the reference signal provided from said matched filter for providing a phase correction signal synchronized to the phase of the data in said block-coded information signal; and digital phase adjusting means responsive to said phase correction signal for shifting the phase of said modulated block-coded information signal before providing it to said demodulator means.

14. A digital information transmission and reception system comprising:

an information source for providing information in the form of a digital data stream;

encoding means responsive to said digital data stream for forming sequential data blocks from said digital data stream which are representative of said information;

sync means, responsive to said digital data stream for generating sequential sync blocks of synchronization data related to said sequential data blocks, each of said sequential sync blocks respectively including a Barker-Code sequence having a high autocorrelation function;

multiplexing means, responsive to said sequential data blocks and said sequential sync blocks for combining said blocks in an alternating manner to form a block-coded information signal;

modulation means, modulating a carrier responsive to said block-coded information signal for providing a modulated block-coded information signal to an information transmission channel;

synchronization data recovery means, responsive to the modulated block-coded information signal as recovered from said information transmission channel, for detecting said prescribed digital signal sequence and providing at an output a reference signal in response to said detection, said synchronization data recovery means comprising a matched filter having coefficients set in accordance with the Barker-Code sequence of said synchronization data;

demodulation means, responsive to said modulated block-coded information signal recovered from said information transmission channel and to said reference signal provided by said synchronization data recovery means, for generating a demodulated block-coded information signal;

a level comparator, responsive to the reference signal provided front said matched filter for providing a phase correction signal synchronized to the phase of the data in said block-coded information signal; and digital phase adjusting means responsive to said phase correction signal for shifting the phase of said modulated block-coded information signal before providing it to said demodulator means.

15. Apparatus for receiving a modulated carrier which includes synchronizing information transmitted therewith, comprising:

receive means for supplying a modulated carrier wave, modulated at selected times in accordance with a prescribed digital sequence having high autocorrelation properties, and modulated at times between said selected times in accordance with another digital signal requiring synchronizing information;

an analog-to-digital converter coupled to said receive means and responsive to said modulated carrier wave for supplying a digitized response to the modulated carrier wave;

a matched filter responsive coupled to said analog-to-digital converter and responsive to said digitized response, for generating a spike signal in response to each prescribed digital sequence, said spike signal providing said required synchronizing information.

16. Apparatus for receiving a modulated carrier which includes synchronizing information within its modulation and for extracting the synchronizing information therefrom, said apparatus comprising:

receive means for supplying a modulated carrier wave, modulated at selected times in accordance with a prescribed digital sequence having high autocorrelation properties, and modulated at times between said selected times in accordance with another digital signal requiring synchronizing information;

an analog-to-digital converter coupled to said receive means and responsive to said modulated carrier wave for supplying a digitized response to the modulated carrier wave;

a matched filter responsive coupled to said analog-to-digital converter and responsive to said digitized response, for generating a spike signal in response to each prescribed digital sequence, said spike signal providing said required synchronizing information;

a phase equalization filter responsive to the digitized response of said analog-to-digital converter, for imparting a phase shift to the digitized response of said analog-to-digital converter as determined by equalization filter coefficients;

means for differentially comparing samples of said spike signal response which flank a peak sample thereof to generate a difference signal; and a read-only memory addressed in response to said difference signal for supplying said equalization filter coefficients to said equalization filter.

17. Apparatus for receiving a modulated carrier, in accordance with claim 15, further comprising:

demodulation means, responsive to the modulated carrier wave and said spike signal provided by said matched filter, for demodulating said modulated carrier wave.

18. A device for recording and reproducing video signals in digital form onto and from a record carrier, said device comprising: an input for receiving a series of images in the form of digital video signals; coding means coupled to said input for converting said series of images into a block-coded signal comprising a series of sequential data blocks having image data and associated sync blocks having synchronization data;

modulating means coupled to said coding means and responsive to said block-coded signal for modulating a carrier signal with said block-coded signal; recording means coupled to said modulating means and responsive to said modulated carrier signal for recording said modulated carrier signal on said record carrier;

playback means coupled to said record carrier for recovering said modulated carrier signal from said record carrier;

demodulator means coupled to said playback means and responsive to a carrier reference signal for demodulating said modulated carrier signal to recover said block-coded signal; and decoding means coupled to said demodulator means and responsive to said block-coded signal for reforming said series of images from said block-coded signal; characterized in that said device further includes:

synchronization signal generating means for inserting a prescribed digital sequence into each of said sync blocks, which prescribed sequence has a high-valued autocorrelation function;

synchronization signal recovery means coupled to said playback means and responsive to said modulated carrier signal provided therefrom for developing a synchronization reference signal in response to one of an autocorrelation or a matched filter detection of said prescribed digital sequence in said modulated carrier signal; and carrier generator means responsive to said synchronization reference signal for developing said carrier reference signal.

19. A device as recited in claim 18, further including a phase adjusting means, coupled between said playback means and said demodulator means, which is responsive to said synchronization reference signal for adjusting the phase of the recovered modulated signal to be substantially synchronous with the phase of the carrier reference signal, before demodulation of the modulated carrier signal.

20. A device as recited in claim 19, wherein said decoding means is also responsive to said synchronization reference signal for synchronizing the reforming of said series of images from said block-coded signal.

21. Apparatus for coding an information signal so as to develop a block-coded signal and for modulating the amplitude of a transmission carrier signal in at least one of two orthogonal phases with multiple-level symbols further encoding said block-coded signal, said multiple-level symbols ranging among more than two levels, comprising:

a block coder for developing said block-coded signal comprising sequential data sub-blocks which include said information signal, and sequential sync sub-blocks which include synchronization data relating to a mapping of said sequential data sub-blocks in regard to at least one dimension, which synchronization data are needed for reconstructing the information signal from the sequential data sub-blocks;

a symbol coder for converting said block-coded signal to said multiple-level symbols modulating the amplitude of said transmission carrier signal in at least one of two orthogonal phases during each of successive time intervals separated from a preceding one of said time intervals by a respective sync insertion interval of a prescribed duration occurring within a prescribed portion of a respective sync sub-block, symbol codes generated from said synchronization data relating to the mapping of said sequential data sub-blocks in regard to at least one dimension occurring within remaining portions of said sync sub-blocks; and a sync block coder for modulating the amplitude of said transmission carrier signal during each said sync insertion interval in accordance with a prescribed digital signal sequence having a high-valued autocorrelation property when there is no phase differential during auto-correlation compared to when there is some phase differential during auto-correlation.

22. Apparatus as recited in claim 21, further including a pseudo-random sequence generator for generating said prescribed digital signal sequence.

23. Apparatus as recited in claim 21, further including a Barker-Code sequence generator for generating said prescribed digital signal sequence.

24. A digital information transmission and reception system in accordance with claim 13, further including:

block decoder means responsive to said demodulated block-coded information signal and said reference signal provided from said synchronization data recovery means for decoding said block-coded information signal, said block decoder means using said reference signal for determining the occurrence of a boundary between successive ones of said blocks.

25. A digital information transmission and reception system in accordance with claim 14, further including:

block decoder means responsive to said demodulated block-coded information signal and said reference signal provided from said synchronization data recovery means for decoding said block-coded information signal, said block decoder means using said reference signal for determining the occurrence of a boundary between successive ones of said blocks.

26. A digital information transmission and reception system in accordance with claim 16, further including:

block decoder means responsive to said demodulated block-coded information signal and said reference signal provided from said synchronization data recovery means for decoding said block-coded information signal, said block decoder means using said reference signal for determining the occurrence of a boundary between successive ones of said blocks.

27. Apparatus for receiving a modulated carrier in accordance with claim 17, further comprising:

a symbol decoder, receiving demodulated carrier wave including demodulated prescribed digital sequences from said demodulator means, and selectively decoding symbols in said other digital signal to generate a symbol decoder output signal, said decoding being discontinued during said demodulated prescribed digital sequences in response to said spike signals from said matched filter.

28. Apparatus for receiving a modulated carrier in accordance with claim 27, further comprising:

a block decoder for decoding a block-coded signal recovered as said symbol decoder output signal, boundaries between blocks in said block-coded signal being determined by said block decoder in response to said spike signals from said matched filter.

29. A digital information transmission and reception system comprising:

an information source for providing information in the form of a digital data stream;

encoding means responsive to said digital data stream for forming sequential data blocks from said digital data stream which are representative of said information;

sync means, responsive to said digital data stream for generating sequential sync blocks of synchronization data related to said sequential data blocks, and including a prescribed digital signal sequence;

multiplexing means, responsive to said sequential data blocks and said sequential sync blocks for combining said blocks in an alternating manner to form a block-coded information signal;

modulation means, modulating a carrier responsive to said block-coded information signal for providing a modulated block-coded information signal to an information transmission channel;

synchronization data recovery means, responsive to said modulated block-coded information signal as recovered from said information transmission channel, for detecting said prescribed digital signal sequence and providing at an output a reference signal in response to said detection;

demodulation means, responsive to said modulated block-coded information signal as recovered from said information transmission channel and to said reference signal provided by said synchronization data recovery means, for generating a demodulated block-coded information signal;

digital phase adjusting means for shifting the phase of said modulated block-coded information signal before providing it to said demodulator means; and phase detection means responsive to said reference signal provided from said synchronization data recovery means for developing control signals for controlling said digital phase adjusting means in a feedback manner, thereby synchronizing the operation of said digital phase adjusting means with said demodulator means.

30. A digital information transmission and reception system in accordance with claim 29, further including:

block decoder means responsive to said demodulated block-coded information signal and said reference signal provided from said synchronization data recovery means for decoding said block-coded information signal, said block decoder means using said reference signal for determining the occurrence of a boundary between successive ones of said blocks.

31. Apparatus for receiving a carrier wave modulated in at least one of two orthogonal phases with multiple-level symbols further encoding a block-coded information signal, said multiple-level symbols ranging among more than two levels, said block-coded information signal including in addition to data transmitted during data block intervals therewithin synchronizing information transmitted during sync block intervals therewithin, at least selected regularly occurring ones of which sync blocks each include a two-level prescribed digital sequence having high autocorrelation properties, said apparatus comprising:

receive means for receiving said carrier wave and supplying the modulated carrier wave at a first carrier frequency substantially removed from zero frequency;

an analog-to-digital converter coupled to said receive means and responsive to the modulated first carrier wave for supplying a digitized response to said modulated first carrier wave;

a matched filter that has a kernel composed of fixed-value weights defined in accordance with said prescribed digital signal sequence, is coupled to said analog-to-digital converter, and supplies an amplitude response to said digitized response that exhibits a respective spike in response to each prescribed digital sequence, the amplitude of which spike responses exceed the response to any of said multiple-level symbols; and a peak detector generating a reference signal in selective response to the spike responses within said amplitude response.

32. Apparatus in accordance with claim 31, further comprising:

a carrier generator generating a second carrier wave similar in frequency to said first carrier wave, reset to a prescribed phasing in response to said reference signal;

a demodulator synchronously demodulating said modulated first carrier wave in accordance with said second carrier wave and generating a demodulated block-coded information signal including demodulated prescribed digital sequences;

means for differentially comparing samples of said spike response which flank a peak sample thereof to generate a difference signal; and digital phase adjusting means responsive to said difference signal for shifting the phase of one of said second carrier and said modulated carrier wave respective to the other as applied to said demodulator means.

33. Apparatus in accordance with claim 32, wherein the prescribed phasing said second carrier wave is reset to in response to said reference signal is invariant, and wherein said digital phase adjusting means comprises:

a phase equalization filter responsive to the digitized response of said analog-to-digital converter, for imparting a phase shift to the digitized response of said analog-to-digital converter as determined by equalization filter coefficients; and a read-only memory addressed in response to said difference signal for supplying said equalization filter coefficients to said equalization filter.

34. Apparatus in accordance with claim 32, further comprising:

a symbol decoder supplied demodulated block-coded information signal including demodulated prescribed digital sequences for selectively decoding the symbols in demodulated block-coded information signal to generate a recovered block-coded information signal as a symbol decoder output signal, said selective decoding being carried out responsive to the absence of said reference signal.

35. Apparatus in accordance with claim 34, further comprising:

a block decoder for decoding said recovered block-coded information signal symbol decoder output signal, said block decoder using said reference signal for determining the occurrence of a boundary between successive ones of said block intervals.

36. Apparatus in accordance with claim 31, further comprising:

a demodulator demodulating said modulated first carrier wave, for generating a demodulated block-coded information signal including demodulated prescribed digital sequences;

a symbol decoder supplied demodulated block-coded information signal including demodulated prescribed digital sequences for selectively decoding the symbols in demodulated block-coded information signal to generate a recovered block-coded information signal as a symbol decoder output signal, said selective decoding being carried out responsive to the absence of said reference signal.

37. Apparatus in accordance with claim 36, further comprising:

a block decoder for decoding said recovered block-coded information signal symbol decoder output signal, said block decoder using said reference signal tier determining the occurrence of a boundary between successive ones of said block intervals.

* * * * *